United States Patent [19]

Aros et al.

[11] Patent Number: 5,750,236

[45] Date of Patent: May 12, 1998

[54] APPARATUS AND METHOD FOR FORMING COMPOUND SHAPED SURFACES

[75] Inventors: Carlos Joaquin Aros; Sylvan S. Throndson Aros, both of Bellflower, Calif.

[73] Assignee: Royal Truck Bodies, Inc., Paramount, Calif.

[21] Appl. No.: 638,352

[22] Filed: Apr. 26, 1996

[51] Int. Cl.$^6$ ................ B32B 1/00; B23P 11/02
[52] U.S. Cl. ................ 428/178; 428/72; 428/76; 428/120; 428/192; 156/202; 156/292; 156/308.4; 52/793.11; 52/787.12; 29/428; 29/457; 29/448; 29/509; 29/897.2
[58] Field of Search .................. 428/178, 174, 428/192, 72, 76, 120; 156/60, 65, 202, 204, 210, 292, 308.4; 29/897.2, 448, 450, 425, 509, 428, 457; 264/241; 52/793.11, 787.12; 72/379.2; 296/24.1

[56] References Cited

U.S. PATENT DOCUMENTS

| | | |
|---|---|---|
| D. 255,228 | 6/1980 | Sauber ............... D12/96 |
| D. 342,930 | 1/1994 | Lewellen et al. ............... D12/196 |
| D. 346,571 | 5/1994 | Lewellen et al. ............... D12/98 |
| D. 351,816 | 10/1994 | Lewellen et al. ............... D12/98 |
| D. 351,817 | 10/1994 | Lewellen et al. ............... D12/98 |
| 3,388,522 | 6/1968 | Lowes ............... 428/178 |
| 3,462,330 | 8/1969 | Greig et al. ............... 428/178 |
| 5,239,753 | 8/1993 | Kalis, Jr. et al. ............... 29/897.2 |
| 5,267,773 | 12/1993 | Kalis, Jr. et al. ............... 296/183 |
| 5,487,930 | 1/1996 | Lockshaw et al. ............... 428/178 |

*Primary Examiner*—Donald Loney
*Attorney, Agent, or Firm*—Oppenheimer Wolff & Donnelly LLP

[57] ABSTRACT

Apparatus and method for forming compound shaped surfaces. A skin conforming to the visual shape of the surface being formed is prepared from a blank sheet of material that is cut to size and includes any desired stamped-out detailing or notched edges or lines. Disposable strips of material are used to form hems in the skin. A preforming die is used to create tight bends or outer contours in the skin. A liner of the desired size and detailing is formed along with two-shaped side flanges. A plurality of ribs or silhouettes are provided and placed into the skin to form and maintain the desired final shape. The pre-formed liner is then assembled to the skin, the ribs being disposed between the liner and the skin.

14 Claims, 6 Drawing Sheets

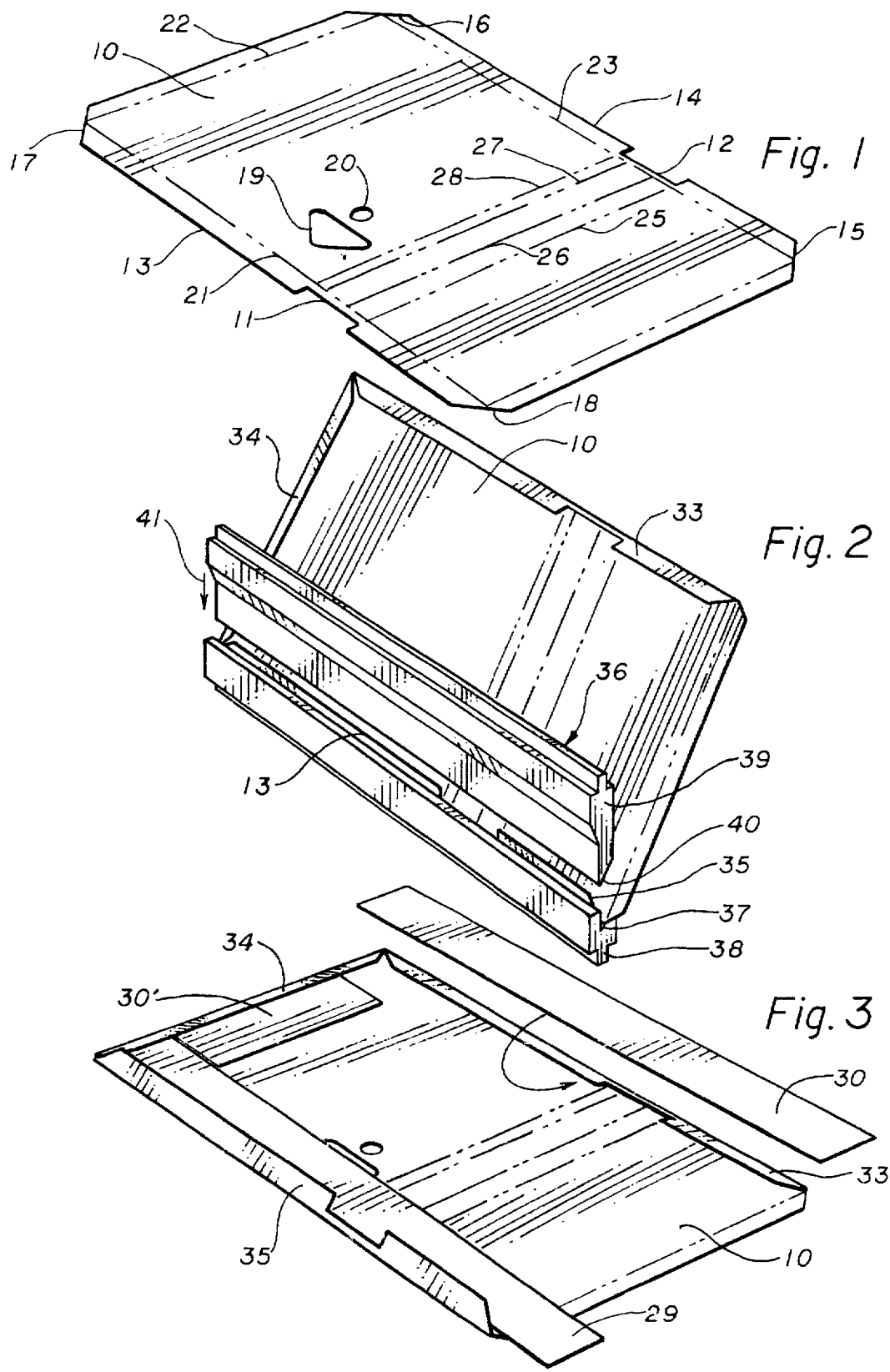

APPARATUS AND METHOD FOR FORMING COMPOUND SHAPED SURFACES

BACKGROUND OF THE INVENTION

1. Field of the Invention

The invention relates to formation of curved surfaces such as vehicle body panels.

2. Description of the Prior Art

Various processes are known in the art for forming curved surfaces, such as compound curved vehicle body panels. In most cases, jigs are used to form such panels. Spacers used between the outer skin and the inner panel are used to hold and maintain the shape of the structures. In the prior art, these spacers are structurally a part of the inner panel.

There is thus a need for an apparatus and method for forming compound curved surfaces, such as vehicle body panels, without using jigs or the like.

SUMMARY OF THE INVENTION

It is an object of this invention to provide apparatus and method for forming compound curved surfaces.

It is a further object of this invention to provide such apparatus and method particularly adapted to form curved vehicle body panels.

It is still further an object of this invention to carry out the foregoing objects without using jigs or the like.

These and other objects are preferably accomplished by forming compound shaped surfaces including the step of conforming a visual shape of the surface being formed from a blank sheet of material that is cut to size and includes any desired stamped-out detailing or notched edges. Disposable strips of material are used to form hems in the skin. A preforming die is used to create tight bends in the skin thereon. A liner of the desired size and detailing is formed along with two spaced side flanges. A plurality of ribs or silhouettes are provided and placed into the skin to form and maintain the desired final shape. The pre-formed liner is then assembled to the skin, the ribs being disposed between the liner and the skin.

BRIEF DESCRIPTION OF THE DRAWINGS

FIG. 1 is a perspective view of the outer skin of the body panel or structure to be formed in accordance with the teachings of the invention;

FIG. 2 is a perspective view of the skin of FIG. 1 illustrating a first process step in forming the panel or structure of the invention;

FIG. 3 is a perspective view of the skin of FIGS. 1 and 2 illustrating another processing step;

DESCRIPTION OF THE PREFERRED EMBODIMENT

Figure 4:
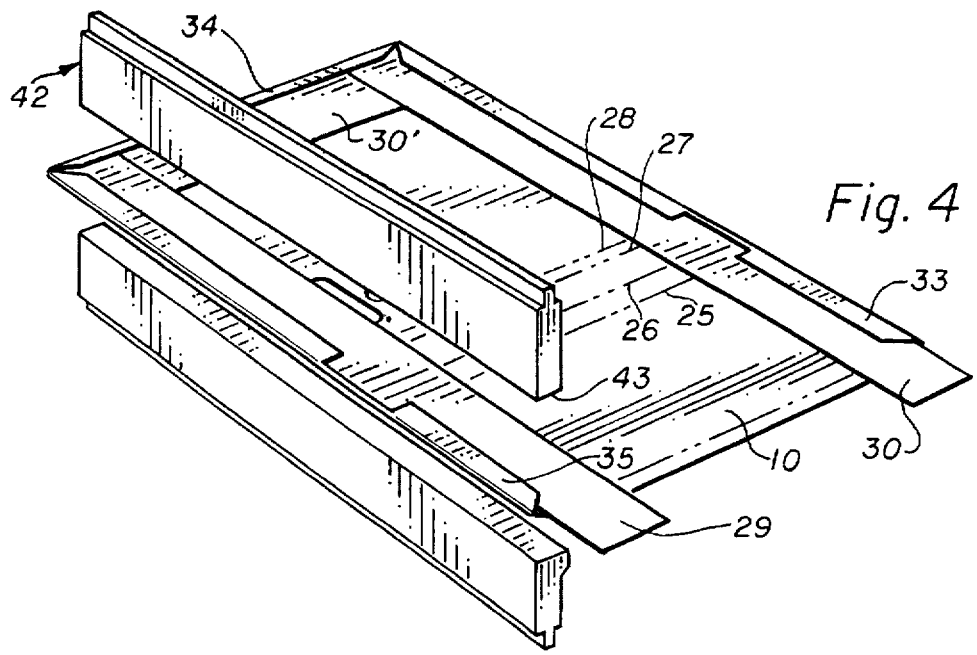
FIG. 4 to 6 are perspective views of subsequent steps in processing the skin of FIG. 1.

Referring now to FIG. 1 of the drawing, a blank sheet 10 of any suitable material, is shown. Since the invention contemplates the formation of making contoured vehicle body panels, the use of electro-galvanized, cold-rolled steel of 14 to 24 gage is preferred. Of course, any other standard sheet metal, such as aluminum or stainless steel, may be used along with other suitable gage thicknesses.

Sheet 10 may also be of any suitable dimensions depending of course on the final body panel size desired. For example, sheet 10 may be 26"×33"; 30"×30"; 15"×40", etc.

Sheet 10 is intended to be the outer skin of the final body panel and may be stamped or cut for special details of the final panel. For example, cut-out areas 11, 12 are provided on opposite elongated edges 13, 14, respectively. Corners 15 through 18 are cut at a 45° angle. A latch pocket cavity 19 and lock hole 20 therefore is stamped out.

As seen in FIG. 2, areas where tight bending will occur are shown at lines 21 through 28. A conventional two piece press break hemming die 36 is used to form flanges that is, one edge, e.g., edge 13, of sheet 10 is disposed in a generally V-shaped cavity 37 in die portion 38 and a mating die portion 39, having an end 40 conforming generally to cavity 37, is pressed down in the direction of arrow 41. This forms an angled hem or flange 35. Flanges or hems 33, 34 have been formed in like manner.

As seen in FIG. 3, a plurality, such as three, of disposable flat strips of sheet metal, such as strips 29, 30, and 30' are provided disposed inside of flanges 33 to 35 prior to flattening of the same. Strips 29, 30, and 30' are of a greater thickness than the material of the liner 50 (FIG. 7) that will be subsequently assembled to sheet 10. Strips 29, 30, and 30' are thus used as separators in the bending and forming of hems or flanges 33 to 35.

As seen in FIG. 4, a conventional straight flattening die 42 comprising of mating die portions 43, 44 is used to flatten hem or flange 35 by pressing the edges together. Strips 29, 30, and 30' remain in place trapped within flanges 33 to 35.

Figure 5:
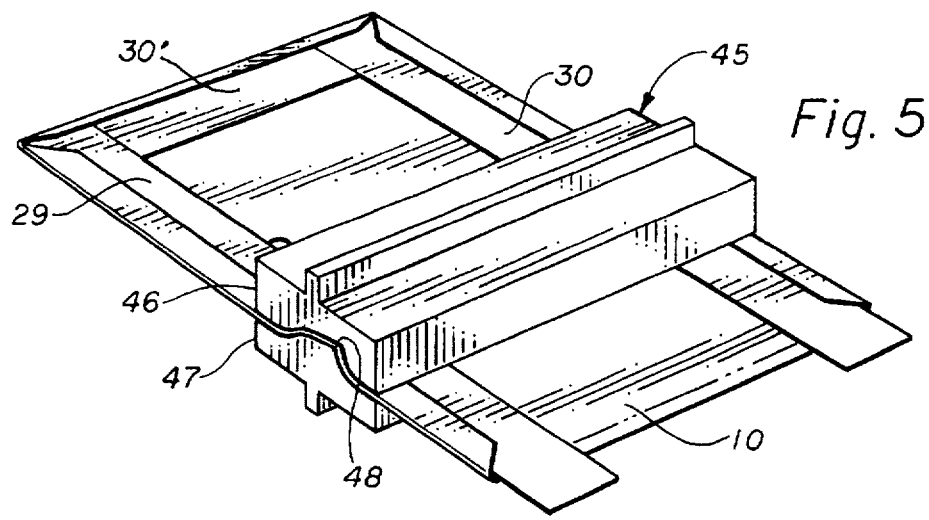
Figure 6:
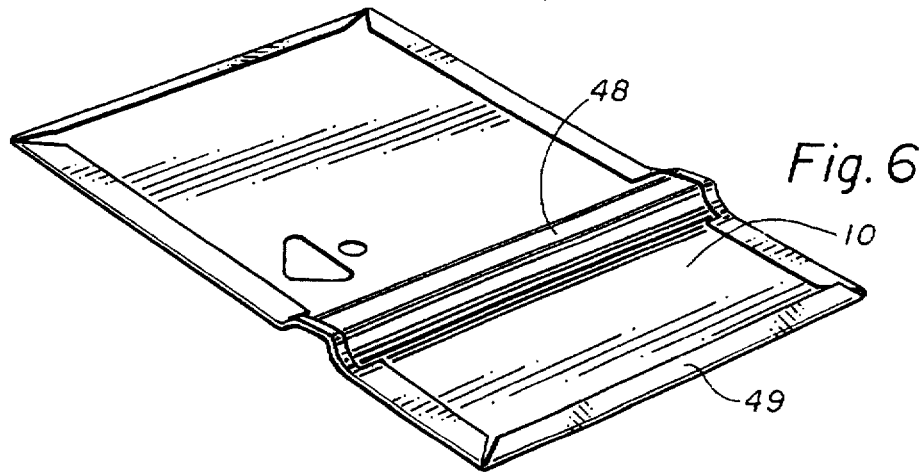

As seen in FIG. 5, a special pre-forming die 45 having upper and lower portions 46, 47, respectively, is used to crease sheet 10 within the areas indicated by phantom lines 25 to 28 to form the contoured or upraised midportion 48 shown in FIG. 6. It can be seen that, in FIG. 5, the mating portions of die 45 are configured to form the contoured portion 48. Strips 29, 30, and 30' are now removed and the remaining hem or flange 49 is formed at an angle of about 150° as heretofore discussed using die 36 of FIG. 2.

Figure 7:
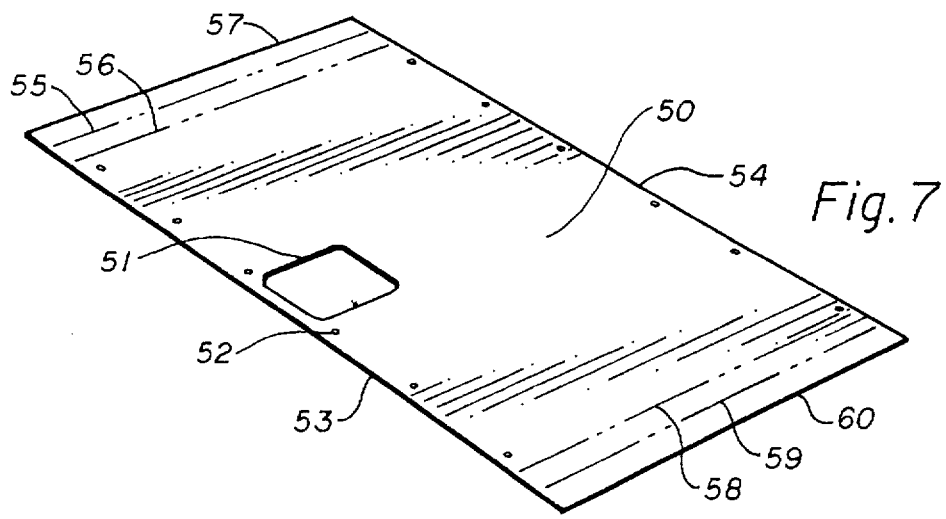
FIG. 7 is a perspective view of a liner to be used with the skin of FIG. 1 in forming a body panel or structure in accordance with the teachings of the invention.

As seen in FIG. 7, a second sheet 50 of metal, similar to sheet 10, of the desired gage is provided. As discussed about with respect to sheet 10, the measurements and materials may vary; however, sheet 50 is preferably about 2" longer in length than sheet 10 and about 2" shorter in width. Sheet 50 which will be the liner of the completed body panel, is then stamped for any special detail, such as a latch pocket access cavity 51. A plurality of 3/16" holes 52 are also stamped about the periphery along sides 53, 54. These holes 52, as will be discussed with respect to the silhouettes or stiffeners of FIGS. 9 and 10, correspond to one end flange of the silhouettes or stiffeners and may be evenly spaced apart, e.e., about 5" apart. Phantom lines 55, 56 adjacent one side 57 and like phantom lines 58, 59 adjacent the opposite side 60 indicate where bending operations will be carried on.

Figure 8:
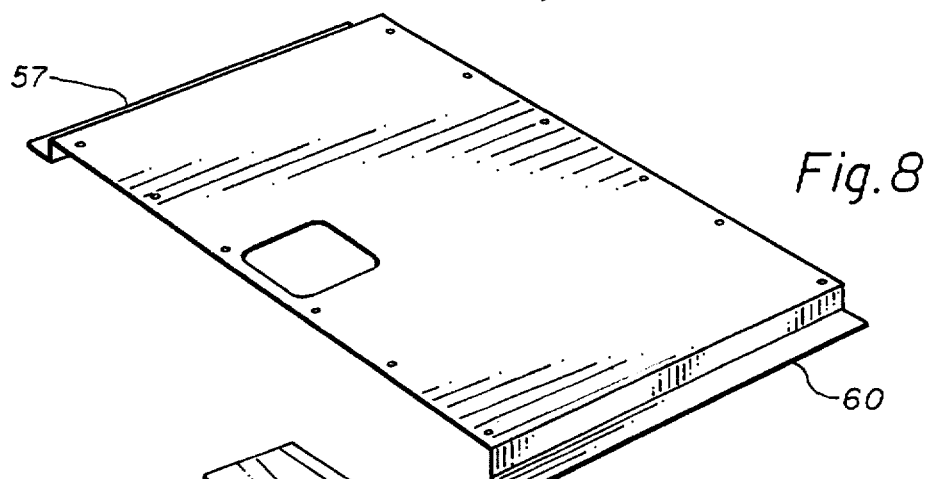
FIG. 8 is a perspective view of the liner of FIG. 7 illustrating a subsequent step in the processing thereof.

As seen in FIG. 8, Z-shaped flanges are formed as is well known in the art at sides 57, 60.

Figure 9:
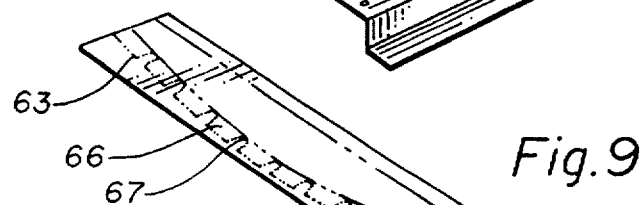
FIG. 9 is a perspective view of a sheet of material used to form structural silhouettes in accordance with the teachings of the invention.
Figure 10:
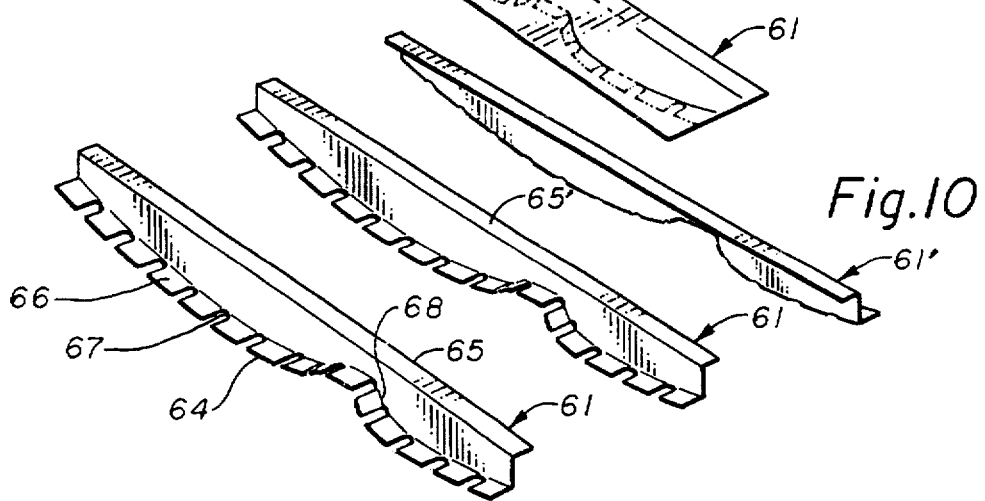
FIG. 10 is a perspective view of two identical and one reversed image silhouettes formed from similar sheets of material as shown in FIG. 9 oriented in the position in which they will be assembled to the skin and panel of FIGS. 1 and 7.

Referring now to FIG. 9, a silhouette or stiffener 61, of sheet metal, is provided of the desired gage and is pre-cut to size in any suitable manner. Stiffener 61 is cut along dotted trace line 63 to form equally spaced teeth 66 along one arcuate path. Thus, as seen in FIG. 10, a plurality of spaced slots 67 are formed along edge 64 allowing this edge to be bent into a curved flange 68. The other edge 65 is then bent in the opposite direction forming a Z-shaped section. Two identical stiffeners 61 and one reversed or mirror image stiffener 61' are shown in FIG. 10 in their proper orientation.

Figure 11:
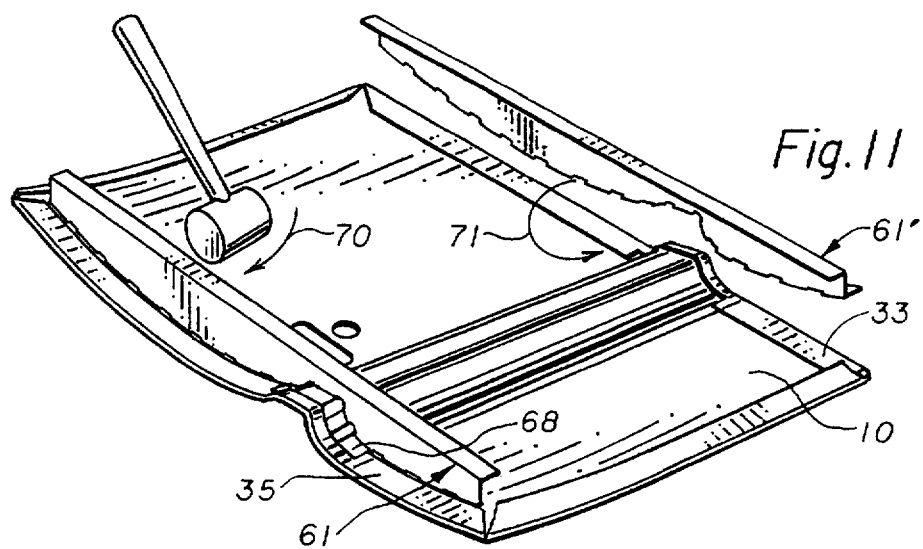
FIG. 11 is a perspective view illustrating the assembly of two of the silhouettes of FIGS. 10 to the skin of FIG. 6.
Figure 12:
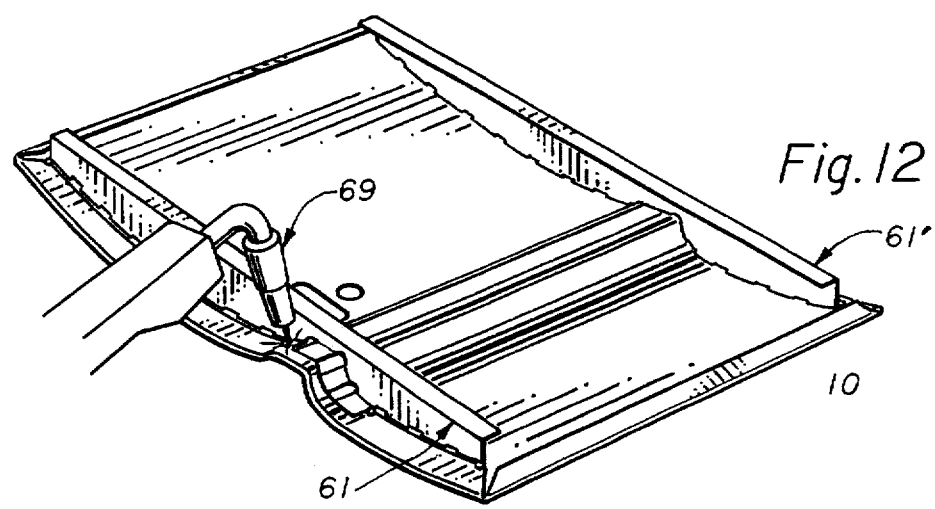
FIG. 12 is a perspective view showing a subsequent step in the assembly of the silhouettes of FIG. 11.

The assembly of three stiffeners, such as stiffeners 61, 61' of FIG. 10, to the skin 10 will now be discussed. Skin 10 is oriented as in FIG. 11. A first stiffener 61 is disposed on top of skin 10 with flange 68 of stiffener 61 located adjacent and under the flange 35. A hammer or mallet may be used to hammer one of the stiffeners 61 in the direction of arrow 70 to lock the same in position. The reversed or mirror image stiffener 61' is mounted under flange 33 in like manner (see arrows 71). The final position of the stiffeners 61, 61' mounted to skin 10 is shown in FIG. 12. A welding gun 69 is used to tack weld the stiffeners (or any other parts) at spaced locations to hold the parts together during assembly.

Figure 13:
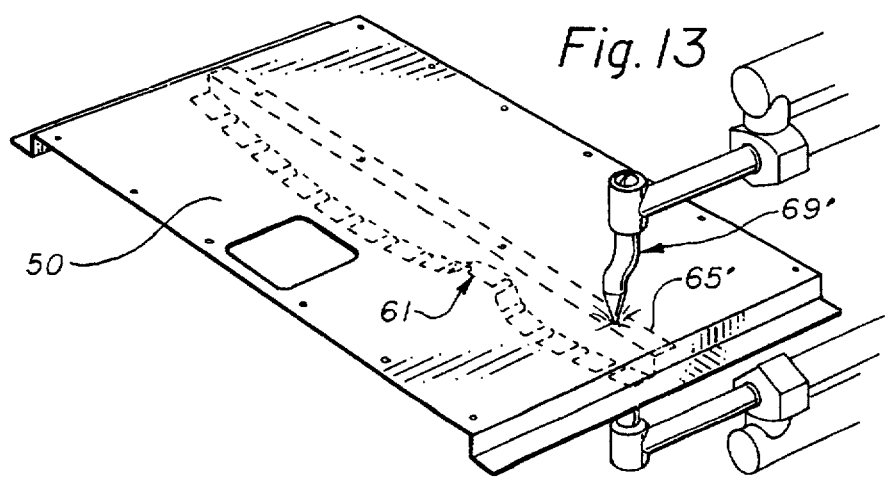
FIG. 13 is a perspective view illustrating the third silhouette of FIG. 10 assembled to the liner of FIG. 7.

The other stiffener 61 is now spot welded along flange 65' (see the dotted lines in FIG. 13) to liner 50 as shown. Other means than welding may be used such as riveting or bolting. Any other accessories desired to be mounted to liner 50 may also be installed thereon at this stage.

Figure 14:
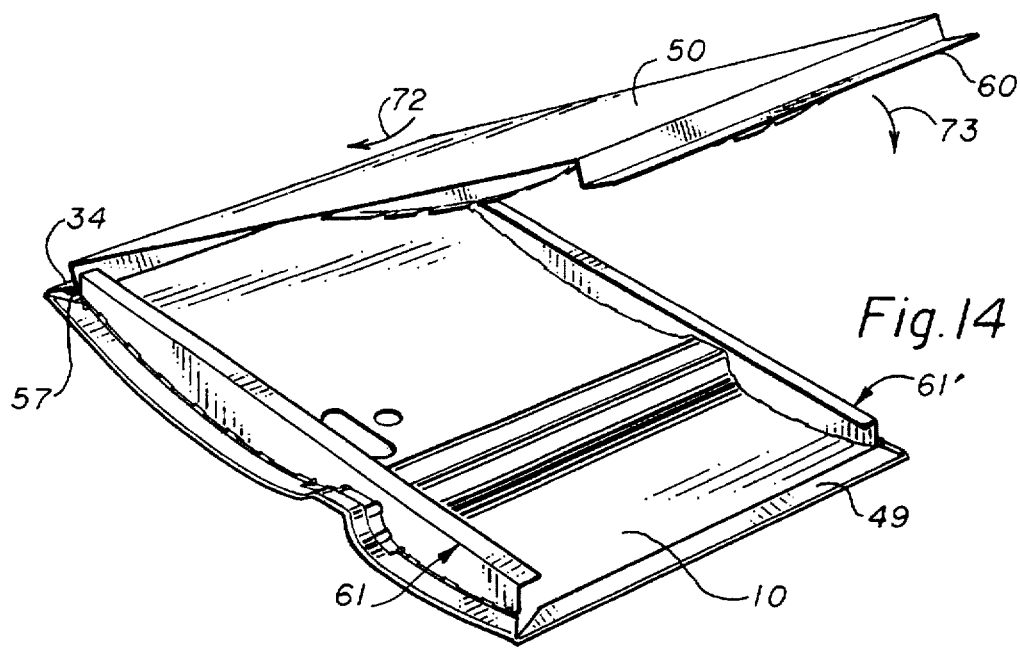
FIG. 14 is a perspective view illustrating the assembly of the liner of FIG. 13 to the skin of FIG. 12.
Figure 15:
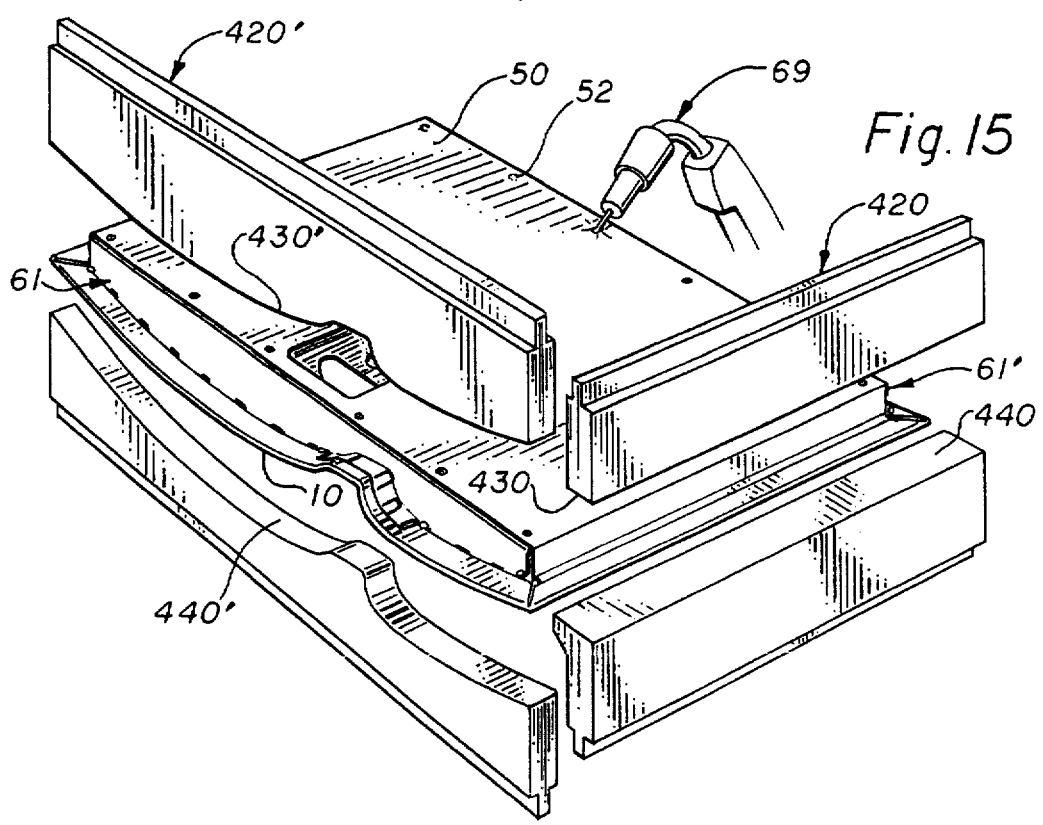
FIG. 15 is a perspective view illustrating the final processing of the parts of FIG. 14.
Figure 16:
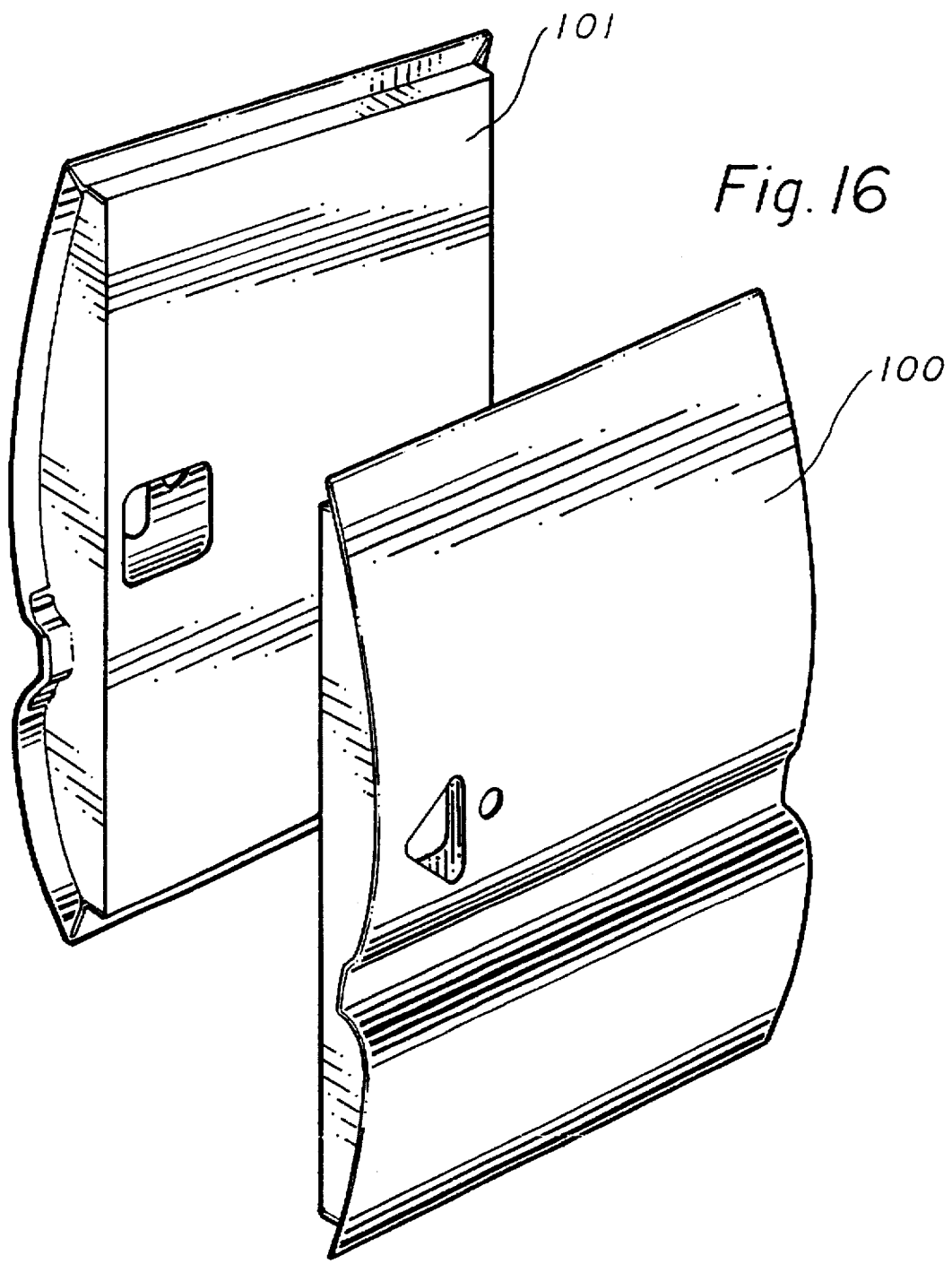
FIG. 16 is a perspective view of two vehicle door panels formed in accordance with the teachings of the invention.

As seen in FIG. 14, the flanged edges 57 of liner 50 is slid under hem 34 of skin 10 (with stiffeners 61, 61' assembled thereto as in FIG. 12) in the direction of arrow 72 with flanged edge 60 of liner 50 slid under hem 49 of skin 10 as indicated by arrow 73. The final installation of liner 50 to skin 10 and stiffener 61, 61' is shown in FIG. 15. The flanges and hems may be pressed together using flattening dies. For example, as seen in FIG. 15, a conventional flattening die 420, having mating portions 430, 440 may be used along the straight end edges. A special flattening die 420', having mating portions 430', 440' may be used along the curved side edges. The flanges and hems may also be spot welded using a welding gun 69 at spaced locations, if desired. Holes 52 are provided so that the resulting other weld lumps may be ground off in the finishing process. Also, if desired, blind rivets or metal screws may be used instead of welding. Finally, a pair of finished vehicle door panel assemblies 100, 101 are shown in FIG. 16 formed in accordance with the teachings of the invention. All rough surfaces, including any weld lumps around holes 52 have been ground off in the finishing process leaving a smooth surface.

It can be seen that a multiple compound curved body panel is formed without the need of using expensive jigs or the like. A pressure brake die is used to form tight bends as in FIG. 5. Curved silhouettes or stiffeners are used to form and maintain the shape of the body panel.

I claim:

1. A compound multi-curved shaped structure comprising:

an outer skin of a rigid material having an outer peripheral edge and a plurality of compound multiple curved sections having a plurality of spaced folded flanges about the outer peripheral edge thereof; contoured;

a generally planar inner panel having an outer peripheral edge of a rigid material spaced from said skin removably interconnected to said skin along mating peripheral edges of both said panel and said skin, said flanges overlapping said outer peripheral edge of said panel; and a plurality of stiffening members of rigid material interconnecting said panel to said skin sandwiched therebetween, said members including at least one member being fixedly interconnected to said skin along one longitudinally extending side thereof and at least another member being fixedly interconnected to said skin along a second longitudinally extending side thereof spaced from said first mentioned side and parallel thereto, said at least one member and said at least another member being secured to said liner.

2. In the structure of claim 1 wherein a third member is sandwiched between said liner and said skin spaced from said at least one member and said at least another member and extending generally parallel thereto and secured to said liner.

3. In the structure of claim 1 wherein said inner panel is removably interconnected to said skin by folded flanges on said skin receiving therebetween flanges on said panel.

4. In the structure of claim 1 wherein said at least one stiffening member and said at least another stiffening member are fixedly interconnected to said skin by flanges on said members disposed between folded flanges on said panel and secured thereto.

5. In the structure of claim 4 wherein said stiffening members are generally planar and elongated having a linearly extending flange disposed along one elongated side thereof abutting against said liner and a contoured flanged elongated side spaced from said one elongated side conforming to the inner contour of said skin and disposed thereagainst.

6. A method for forming a compound shaped structure comprising the steps of:

providing a planar sheet of rigid material for the outer skin of said structure;

forming elongated V-shaped flanges along two spaced longitudinally extending sides of said skin and a V-shaped flange along one of the ends of said skin interconnecting said sides;

placing removable planar spacers under each V-shaped flange;

flattening each of said flanges;

forming a contoured configuration in said skin between said longitudinally extending sides thereof;

removing said spacers;

forming a V-shaped flange along the other end of said skin;

providing a planar sheet of rigid material for the inner liner of said structure longer in length than said skin and shorter in width thereof;

forming flanges on opposite sides of said liner interconnecting said longitudinal sides thereof;

providing a plurality of elongated stiffening members, each of said members having a flange along one elongated side thereof and a contoured flange along the other elongated side thereof;

inserting the contoured flange of one of said stiffening members under the flange extending along one longitudinally side of said skin and inserting the contoured flange of another of said stiffening members under the flange extending along the other longitudinally extending side of said skin;

fixedly securing said contoured flanges to said mating skin flanges;

attaching the elongated flange of a third stiffening member to one side of said liner between said flanges thereon at generally the midpoint thereof and extending between said flanges on said liner;

inserting one flange on said liner under one end flange on said skin and inserting the other flange on said liner under the other end flange on said skin until said elongated flanges on said stiffening members abut against said liner;

flattening the flanges on said skin onto the flanges of both said liner and said stiffening members extending along the longitudinally extending sides of said skin; and firmly attaching said liner to the longitudinally extending flanges on said stiffening members extending along the longitudinally extending sides of said skin.

7. In the method of claim 6 wherein said liner is firmly attached to said stiffening members by welding.

8. In the method of claim 7 wherein said stiffening member disposed between said one of said stiffening members and said another of said stiffening members is welded to said liner.

9. In the method of claim 6 wherein said V-shaped flanges are at an angle of about 150°.

10. In the method of claim 6 wherein the steps of forming said V-shaped flanges includes the step of using a two piece press break hemming die, one piece being disposed along one side of said skin and one piece being disposed along the other side of said skin, said pieces being brought together trapping said skin therebetween forming said flange.

11. In the method of claim 6 wherein the first mentioned step of flattening said flanges includes the step of providing a two piece flattening die, one piece being disposed against said flanges on one side of said skin and the other piece being disposed against said flanges on the other side of said skin, said pieces being brought together to trap said flanges therebetween.

12. In the method of claim 11 wherein the step of forming said contoured configuration includes the step of providing a two piece pre-forming die, one piece being disposed on one side of said skin and the other piece being disposed on the other side of said skin, said pieces being brought together to form said contoured configuration.

13. In the method of claim 12 wherein the second mentioned step of flattening said flanges includes the step of using said flattening die along the mating straight sides of said skin and said liner and said two piece pre-forming die along the mating curved sides of said skin and said liner.

14. In the method of claim 6 including the step of providing a plurality of said holes adjacent the longitudinally extending sides of said liner, and aligning said holes with the elongated flanges of said stiffening members disposed adjacent said longitudinally extending sides of said liner, tack welding said liner to said elongated flanges at said holes forming weld lumps thereat, and subsequently grinding said lumps until the surfaces of said liner surrounding said lumps is smooth.

* * * * *